United States Patent
Lee et al.

(10) Patent No.: US 11,054,436 B2
(45) Date of Patent: Jul. 6, 2021

(54) APPARATUS FOR SENSING ROTATING DEVICE

(71) Applicant: Samsung Electro-Mechanics Co., Ltd., Suwon-si (KR)

(72) Inventors: Dong Yeol Lee, Suwon-si (KR); Soon Joung Yio, Suwon-si (KR); Jae Hyuk Jang, Suwon-si (KR); Hee Seung Kim, Suwon-si (KR); Young Seung Roh, Suwon-si (KR); Jae Sun Won, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 162 days.

(21) Appl. No.: 16/412,708

(22) Filed: May 15, 2019

(65) Prior Publication Data
US 2020/0033375 A1 Jan. 30, 2020

(30) Foreign Application Priority Data

Jul. 27, 2018 (KR) .......................... 10-2018-0088093
Oct. 12, 2018 (KR) .......................... 10-2018-0121710

(51) Int. Cl.
*G01P 3/44* (2006.01)
*G01P 3/66* (2006.01)
(Continued)

(52) U.S. Cl.
CPC ................ *G01P 3/44* (2013.01); *G01P 1/026* (2013.01); *G01P 3/66* (2013.01); *G01D 5/2006* (2013.01)

(58) Field of Classification Search
CPC .............................. G01P 3/66; G01D 5/3473
See application file for complete search history.

(56) References Cited

U.S. PATENT DOCUMENTS

| 2011/0109304 A1* | 5/2011 | Suzuki | .................. H02K 29/12 |
| | | | 324/207.25 |
| 2017/0003182 A1* | 1/2017 | Schweizer | .............. G01L 3/104 |

FOREIGN PATENT DOCUMENTS

| JP | 2006-214948 A | 8/2006 |
| JP | 2009-128312 A | 6/2009 |

(Continued)

OTHER PUBLICATIONS

Korean Office Action dated Nov. 6, 2019 in counterpart Korean Patent Application No. 10-2018-0121710 (8 pages in English and 7 pages in Korean).

*Primary Examiner* — Paul M. West
*Assistant Examiner* — Mark A Shabman
(74) *Attorney, Agent, or Firm* — NSIP Law

(57) ABSTRACT

An apparatus for sensing a rotating body includes a cylindrical supporting member being connected to a rotating shaft, a unit to be detected including a first pattern portion provided in a first height region of the supporting member, and the first pattern portion including first patterns extended in a rotation direction of the rotating shaft and a second pattern portion provided in a second height region of the supporting member, extended in a rotation direction of the rotating shaft, and the second pattern portion including second patterns having an angle difference with the first patterns, and a sensor module including a first sensor disposed opposite to the first pattern portion and a second sensor disposed opposite to the second pattern portion, the first patterns and the second patterns are formed of a metallic material, and each of the first sensor and the second sensor includes a sensing coil.

16 Claims, 3 Drawing Sheets

(51) Int. Cl.
*G01P 1/02* (2006.01)
*G01D 5/20* (2006.01)

(56) References Cited

FOREIGN PATENT DOCUMENTS

| | | |
|---|---|---|
| JP | 2009-168679 A | 7/2009 |
| JP | 2012-122780 A | 6/2012 |

* cited by examiner

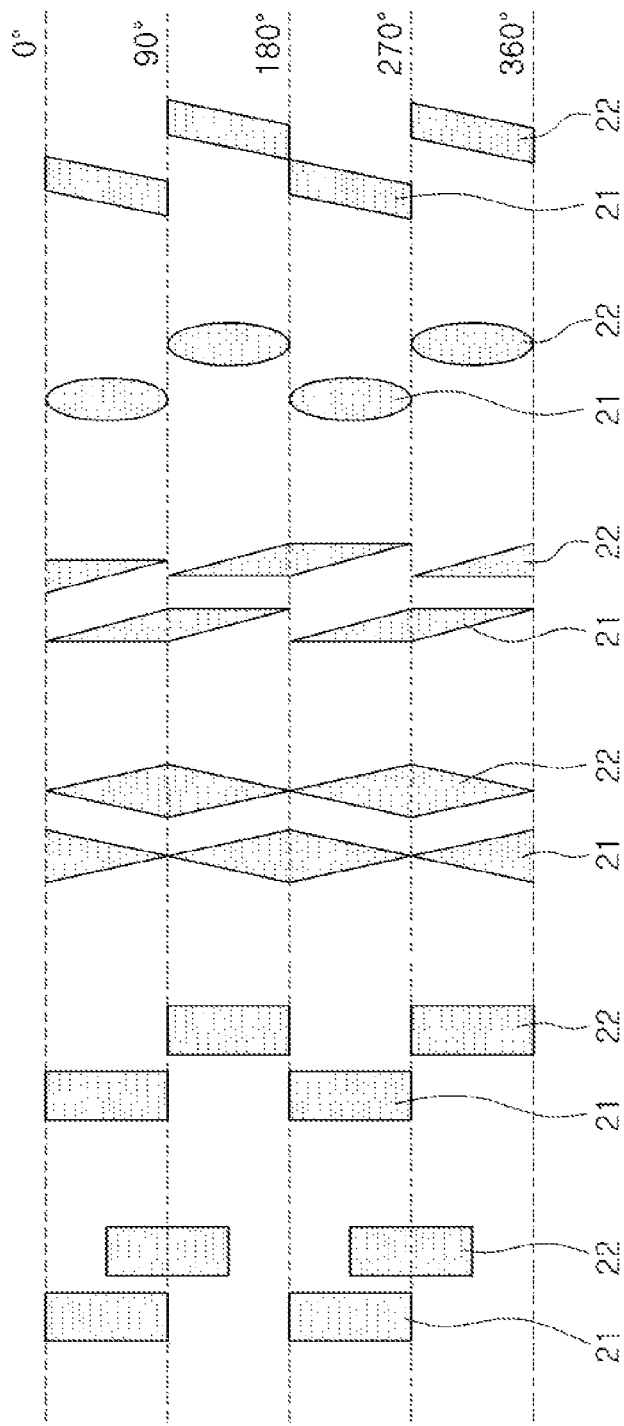

APPARATUS FOR SENSING ROTATING DEVICE

CROSS-REFERENCE TO RELATED APPLICATION(S)

This application claims the benefit under 35 U.S.C. § 119(a) of Korean Patent Application Nos. 10-2018-0088093 filed on Jul. 27, 2018 and 10-2018-0121710 filed on Oct. 12, 2018 in the Korean Intellectual Property Office, the entire disclosures of which are incorporated herein by reference for all purposes.

BACKGROUND

1. Field

The present disclosure relates to an apparatus for sensing a rotating body.

2. Description of Related Art

A rotating body is applied to various fields such as, for example, a motor, a wheel switch of a wearable device, and is preferred in a miniature form with a slim profile. A sensing circuit for detecting a position of a rotating body detects a minute displacement of the rotating body.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to an aspect there is discloses an apparatus for sensing a rotating body, including a supporting member having a cylindrical shape, and being connected to a rotating shaft, a unit to be detected including a first pattern portion provided in a first height region of the supporting member, and the first pattern portion including first patterns extended in a rotation direction of the rotating shaft and a second pattern portion provided in a second height region of the supporting member, extended in a rotation direction of the rotating shaft, and the second pattern portion including second patterns disposed to have an angle difference with the first patterns, and a sensor module including a first sensor disposed opposite to the first pattern portion and a second sensor disposed opposite to the second pattern portion, wherein the first patterns and the second patterns are formed of a metallic material, and each of the first sensor and the second sensor comprises a sensing coil.

The supporting member may be formed of plastic.

A groove portion, extended in the rotation direction, may be provided on a side surface of the supporting member.

The first pattern portion and the second pattern portion may be provided in the groove portion.

The first pattern portion and the second pattern portion may be exposed externally.

The apparatus for sensing a rotating body may include a rotation information calculator configured to calculate rotation information comprising any one or any combination of a rotation angle and an angular velocity from inductance of the sensing coil of the first sensor, and inductance of the sensing coil of the second sensor.

The first patterns and the second patterns may have a size and a separation distance, corresponding to a reference angle.

The first patterns and the second patterns may be disposed to have an angle difference corresponding to half of the reference angle.

The first sensor and the second sensor may have a size corresponding to half of the reference angle.

A shape of the first patterns and the second patterns may be any one of rectangular, elliptical, parallelogram, rhombic, and trapezoidal shapes.

According to another aspect there is discloses an apparatus for sensing a rotating body, including a supporting member having a cylindrical shape, and being connected to a rotating shaft, a unit to be detected including a first pattern portion provided in a first height region of the supporting member, and the first pattern portion including first patterns extended in a rotation direction of a rotating shaft, and a second pattern portion provided in a second height region of the supporting member, extended in the rotation direction of the rotating shaft, and the second pattern portion including second patterns disposed to have a angle difference with the first patterns, and a sensor module including a first sensor disposed opposite to the first pattern portion and a second sensor disposed opposite to the second pattern portion, wherein the first patterns and the second patterns are formed of a metallic material, and the first patterns and the second patterns have a thickness of 8 µm to 12 µm.

The supporting member may be formed of plastic.

A groove portion, extended in the rotation direction, may be provided on a side surface of the supporting member.

The first pattern portion and the second pattern portion may be provided in the groove portion.

The first pattern portion and the second pattern portion may be exposed externally.

A shape of the first patterns and the second patterns may be any one of rectangular, elliptical, parallelogram, rhombic, and trapezoidal shapes.

Other features and aspects will be apparent from the following detailed description, the drawings, and the claims.

BRIEF DESCRIPTION OF DRAWINGS

FIGS. 3A to 3F are diagrams illustrating examples of a unit to be detected.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
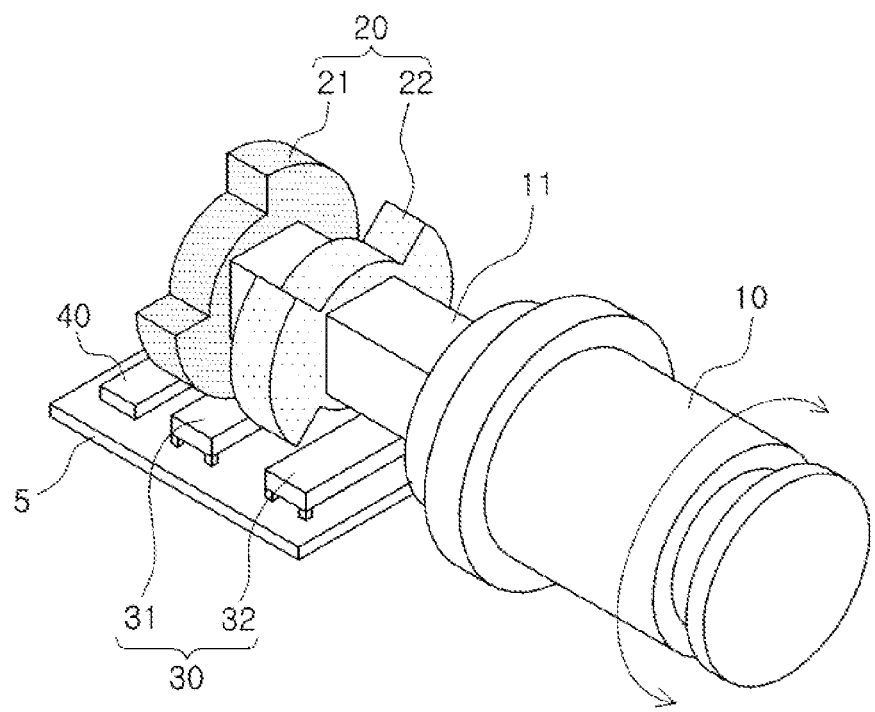
FIG. 1 is a diagram illustrating an example of an apparatus for sensing a rotating body.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. The terminology used herein is for describing various examples only, and is not to be used to limit the disclosure. As used herein, the term "and/or" includes any and all combinations of one or more of the associated listed items.

The use of the term "may" with respect to an example or embodiment, e.g., as to what an example or embodiment may include or implement, means that at least one example or embodiment exists in which such a feature is included or implemented while all examples and embodiments are not limited thereto.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby.

As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The contents of the present disclosure described below may have a variety of configurations and propose only a required configuration herein, but are not limited thereto.

FIG. 1 is a diagram illustrating an example of an apparatus for sensing a rotating body.

The apparatus for sensing a rotating body may include a unit to be detected 20, a sensor module 30, and a rotation information calculator 40, and may further include a substrate 5.

The unit to be detected 20 may be connected to a wheel 10, through a rotating shaft 11. The wheel 10 may be a rotating body in an electronic device and rotated clockwise or counterclockwise by a user. The unit to be detected 20 may rotate together with the wheel 10, either clockwise or counterclockwise.

The unit to be detected 20 may include a first pattern portion 21 and a second pattern portion 22. The first pattern portion 21 and the second pattern portion 22 are provided to have the same shape, and may be combined with the rotating shaft 11 in a direction of extension of the rotating shaft 11. The first pattern portion 21 and the second pattern portion 22 may be rotated in the same direction and at the same speed by the rotating shaft.

In an example, each of the first pattern portion 21 and the second pattern portion 22 may include patterns having the same shape. In an example, the first pattern portion 21 includes first patterns, and the second pattern portion 22 includes second patterns.

The first patterns of the first pattern portion 21 are extended in the direction of rotation, and the second patterns of the second pattern portion 22 are extended in the direction of rotation. An extension length of the first pattern portion 21 in a rotation direction of the first pattern may be defined as a size of a first pattern, and an extension length of the second pattern portion 22 in a rotation direction of the second pattern may be defined as a size of a second pattern.

The first patterns of the first pattern portion 21 are spaced apart from each other by a distance in a rotation direction, and the second patterns of the second pattern portion 22 are spaced apart from each other by a distance in a rotation direction. In an example, a separation distance of the first patterns of the first pattern portion 21 may be the same as a size of a first pattern, and a separation distance of the second patterns of the second pattern portion 22 may be the same as a size of a second pattern.

As an example, the first patterns of the first pattern portion 21 may have a size corresponding to a rotation angle of 90°, and a separation distance between the first patterns may be a rotation angle of 90°. Thus, the first pattern portion 21 may have two first patterns having a size of 90°. In a similar manner, the second patterns of the second pattern portion 22 may have a size corresponding to a rotation angle of 90°, and a separation distance between the second patterns may correspond to a rotation angle of 90°. Thus, the second pattern portion 22 may have two second patterns having a size of 90°.

However, a size and the number of first patterns and second patterns may be changed, without departing from the spirit and scope of the illustrative examples described. As an example, the first pattern portion 21 may have three first patterns having a size of 60°, and the second pattern portion 22 may have three second patterns having a size of 60°.

Hereinafter, for convenience of explanation, it is assumed that the first pattern portion 21 has two first patterns having a size of 90°, and the second pattern portion 22 has two second patterns having a size of 90°. Moreover, it may be applied to a pattern portion having patterns in various angle sizes and various numbers described below.

In FIG. 1, a protruding region of each of the first pattern portion 21 and the second pattern portion 22 corresponds to a pattern. In an example, a disk-type metal and magnetic material is processed to form sawtooth allowing patterns to be spaced apart from each other, so the first patterns of the first pattern portion 21 and the second patterns of the second pattern portion 22 are manufactured. Thus, the first patterns of the first pattern portion 21 and the second patterns of the second pattern portion 22 may be formed of one from among a metal and a magnetic material.

In an example, the first patterns of the first pattern portion 21 and the second patterns of the second pattern portion 22 may be disposed to have an angle difference. As an example, the first patterns of the first pattern portion 21 and the second patterns of the second pattern portion 22 may be disposed to have an angle difference corresponding to half of a size of a first pattern and half of a size of a second pattern.

When the first pattern portion 21 has two first patterns having a size of 90° and the second pattern portion 22 has two second patterns having a size of 90°, the first patterns of the first pattern portion 21 and the second patterns of the second pattern portion 22 may be disposed so as to have an angle difference of 45 degrees. Thus, some regions of the first patterns of the first pattern portion 21 and the second patterns of the second pattern portion 22 may overlap in a direction in which the rotating shaft 11 is extended.

As another example, the first patterns of the first pattern portion 21 and the second patterns of the second pattern portion 22 may be disposed to have an angle difference corresponding to a size of a first pattern and a size of a second pattern.

When the first pattern portion 21 has two first patterns having a size of 90°, and the second pattern portion 22 has two second patterns having a size of 90°, the first patterns of the first pattern portion 21 and the second patterns of the second pattern portion 22 may be disposed so as to have an angle difference of 90°. Thus, there may be no region in which the first patterns of the first pattern portion 21 and the second patterns of the second pattern portion 22 overlap in a direction in which the rotating shaft 11 is extended.

The sensor module 30 may include sensors. As an example, the sensor module 30 may include a first sensor 31 and a second sensor 32. The first sensor 31 and the second sensor 32 are disposed in a direction of extension of the rotating shaft 11. The first sensor 31 is disposed opposite to the first pattern portion 21, and the second sensor 32 is disposed opposite to the second pattern portion 22.

According to rotation of the first pattern portion 21 and the second pattern portion 22, an area of the first sensor 31, overlapped with the first pattern portion 21, is changed, and an area of the second sensor 32, overlapped with the second pattern portion 22, is changed. The first sensor 31 and the second sensor 32 may detect a change in an overlapping area with the first pattern portion 21 and the second pattern portion 22.

In an example, the first sensor 31 and the second sensor 32 may be of a length corresponding to a direction in which a rotating body rotates. As an example, the sizes of the first sensor 31 and the second sensor 32 may correspond to half of a first pattern of the first pattern portion 21 and a second pattern of the second pattern portion 22. In another example, the first patterns of the first pattern portion 21 and the second patterns of the second pattern portion 22 are disposed to have an angle difference, corresponding to half of a size of a first pattern and a size of a second pattern, the sizes of the first sensor 31 and the second sensor 32 may correspond to an angle difference of the first patterns of the first pattern portion 21 and the second patterns of the second pattern portion 22.

In an example, each of the first sensor 31 and the second sensor 32 may include a sensing coil. In an example, the sensing coil forms a circuit pattern on a substrate 5, and may be provided in the substrate 5. In an example, the sensing coil may be provided as one of a winding inductor coil and a solenoid coil. The first sensor 31 and the second sensor 32, which are provided as the sensing coil, may detect a rotation angle of a rotating body, according to inductance that is changed depending on an area overlapped with the first pattern portion 21 and the second pattern portion 22.

The rotation information calculator 40 is configured as an integrated circuit and mounted on the substrate 5, and the rotation information calculator 40 may be electrically connected to the first sensor 31 and the second sensor 32. The rotation information calculator 40 may calculate rotation information including any one or any combination of a rotation direction, a rotation angle, and an angular velocity of a rotating body depending on a change in inductance of the first sensor 31 and the second sensor 32.

Figure 2:
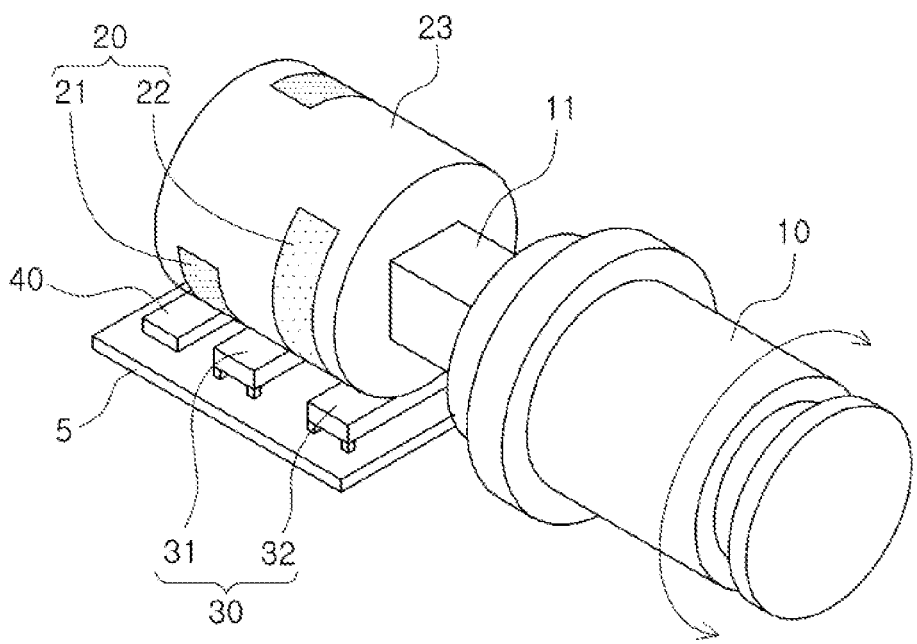
FIG. 2 is a diagram illustrating an example of an apparatus for sensing a rotating body.

FIG. 2 is a diagram illustrating an example of an apparatus for sensing a rotating body. An apparatus for sensing a rotating body of FIG. 2 is similar to an apparatus for sensing a rotating body of FIG. 1, so duplicate descriptions may be omitted. In addition to the description of FIG. 2 below, the descriptions of FIG. 1 are also applicable to FIG. 2, and are incorporated herein by reference. Thus, the above description may not be repeated here.

Referring to FIG. 2, an apparatus for sensing a rotating body may further include a supporting member 23 connected to the rotating shaft 11.

The supporting member 23 is connected to the rotating shaft 11, and may rotate clockwise or counterclockwise around the rotating shaft 11 according to rotation of the wheel 10. As an example, the supporting member 23 may be provided to have a cylindrical form. The supporting member 23 may be formed of a nonmetallic material. As an example, the supporting member 23 may be formed of plastic.

A unit to be detected 20 may be disposed in the supporting member 23. The unit to be detected 20 may include a first pattern portion 21 and a second pattern portion 22, disposed on a side surface of the supporting member 23 having a cylindrical form.

The first pattern portion 21 may include first patterns extended in a rotation direction in a first height region of the supporting member 23, and the second pattern portion 22 may include second patterns extended in a rotation direction in a second height region of the supporting member 23.

Here, the first patterns of the first pattern portion 21 and the second patterns of the second pattern portion 22 may be formed of one of a metal and a magnetic material.

In an example, the supporting member 23 may be formed of a nonmetallic material such as plastic, and the first pattern portion 21 and the second pattern portion 22 may be formed of a metal. In an example, the supporting member 23 may be manufactured through an injection molding process using plastic, and the first pattern portion 21 and the second pattern portion 22 may be formed through a plating process.

In an example, the first pattern portion 21 and the second pattern portion 22 may be disposed on a side surface of the supporting member 23. In an example, a groove portion for providing the first pattern portion 21 and the second pattern portion 22 is formed in a side surface of the supporting member 23. In an example, the groove portion may be extended according to the rotation direction, for formation of the first pattern portion 21 and the second pattern portion 22. The first pattern portion 21 and the second pattern portion 22 are disposed in the groove portion provided in a side surface of the supporting member 23, to be exposed externally. In an example, the groove portion may have a thickness of 8 μm to 12 μm, and the first pattern portion 21 and the second pattern portion 22 may have a thickness of 8 μm to 12 μm. Thus, a step or indentation may not be generated in a side surface of the supporting member 23 due to the first pattern portion 21 and the second pattern portion 22, being provided in the groove portion.

A thin pattern is manufactured using an injection molding process, a plating process, or the like, so that the apparatus for sensing a rotating body of FIG. 2 may be advantageous for mass production and cost reduction.

In the embodiment described above, it is described that first patterns of the first pattern portion 21 are spaced apart from each other by a distance in a rotation direction, and a second patterns of the second pattern portion 22 are spaced apart from each other by a predetermined distance in a rotation direction, while it is described that first patterns of the first pattern portion 21 and second patterns of the second pattern portion 22 are disposed to have an angle difference. However, a first pattern portion 21 and a second pattern portion 22 may be modified to have various forms for detecting a rotation angle. Hereinafter, referring to FIGS. 3A to 3F, a unit to be detected according to various embodiments will be described.

FIGS. 3A to 3F are diagrams illustrating examples of a unit to be detected.

Referring to FIG. 3A, a pattern of the first pattern portion 21 and the second pattern portion 22 of the unit to be detected 20 may be formed to have a rectangular shape extended in a rotation direction. A first pattern of the first pattern portion 21 and a second pattern of the second pattern portion 22 may be disposed so as to have an angle difference of 45°.

The first patterns of the first pattern portion 21 may have a size corresponding to a rotation angle of 90°, and a separation distance between the first patterns may correspond to a rotation angle of 90°. Moreover, the second patterns of the second pattern portion 22 may have a size corresponding to a rotation angle of 90°, and a separation distance between the second patterns may correspond to a rotation angle of 90°.

Referring to FIGS. 3B, 3E, and 3F, a pattern of the first pattern portion 21 and the second pattern portion 22 may be formed to have a rectangular shape, an elliptical shape, and a parallelogram shape, extended in a rotation direction, while a first pattern of the first pattern portion 21 and a second pattern of the second pattern portion 22 may be disposed so as to have an angle difference of 90°.

The first patterns of the first pattern portion 21 may have a size corresponding to a rotation angle of 90°, and a separation distance between the first patterns may correspond to a rotation angle of 90°. Moreover, the second patterns of the second pattern portion 22 may have a size corresponding to a rotation angle of 90°, and a separation distance between the second patterns may correspond to a rotation angle of 90°.

Referring to FIGS. 3C and 3D, a pattern of the first pattern portion 21 and the second pattern portion 22 is continuously arranged, and may be formed to have a rhombic shape and a trapezoidal shape, extended in a rotation direction. A pattern of the first pattern portion 21 and the second pattern portion 22 of FIGS. 3C and 3D is continuously arranged without a separation distance, while a first pattern of the first pattern portion 21 and a second pattern of the second pattern portion 22 may be arranged to be shifted by half of a size of the pattern in a rotation direction.

A pattern of the first pattern portion 21 and the second pattern portion 22 is formed to have a rhombic shape and a trapezoidal shape to be continuously arranged, and a size thereof is repeatedly increased and decreased in a rotation direction periodically. Thus, due to the pattern having a rhombic shape and a trapezoidal shape, an angle may be detected.

Hereinafter, for convenience of explanation, it is assumed that a pattern of the first pattern portion 21 and the second pattern portion 22 is formed to have the shape illustrated in FIG. 3A. Here, the following description may be applied to a shape of a pattern of the first pattern portion 21 and a second pattern portion 22 according to various embodiments, such as, for example, any of the embodiments of FIGS. 3B-3F.

Figure 4A:
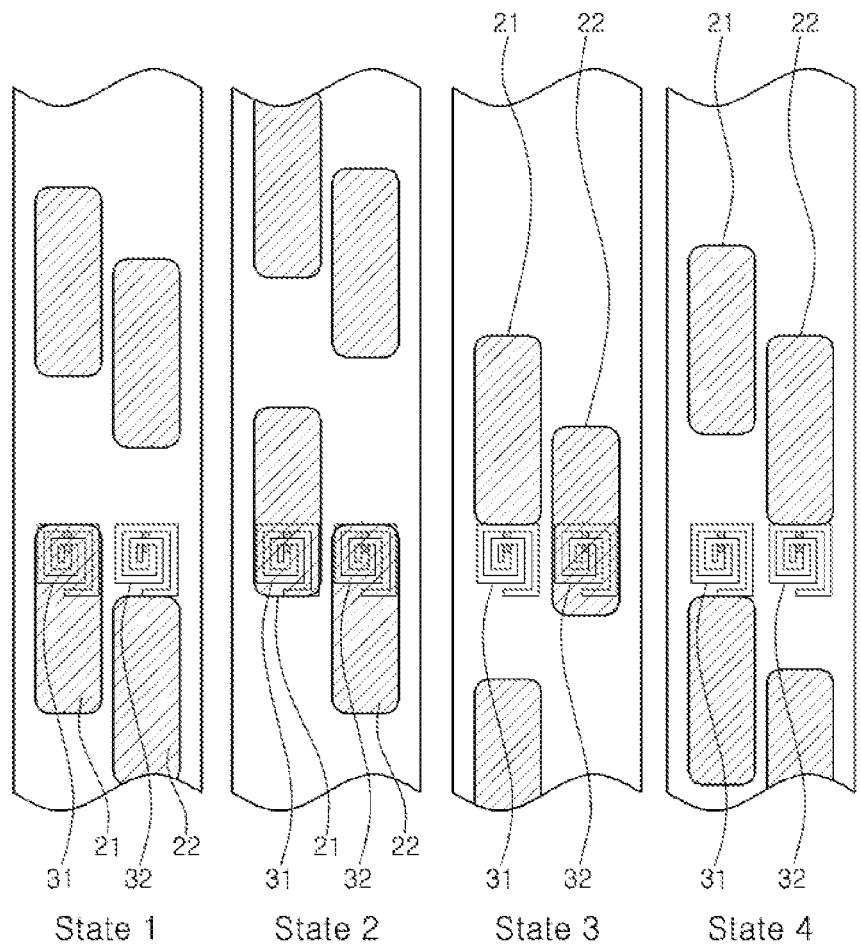
FIG. 4A is a diagram illustrating an example of a positional relationship of a unit to be detected and a sensor module according to rotation of the unit to be detected.
Figure 4B:
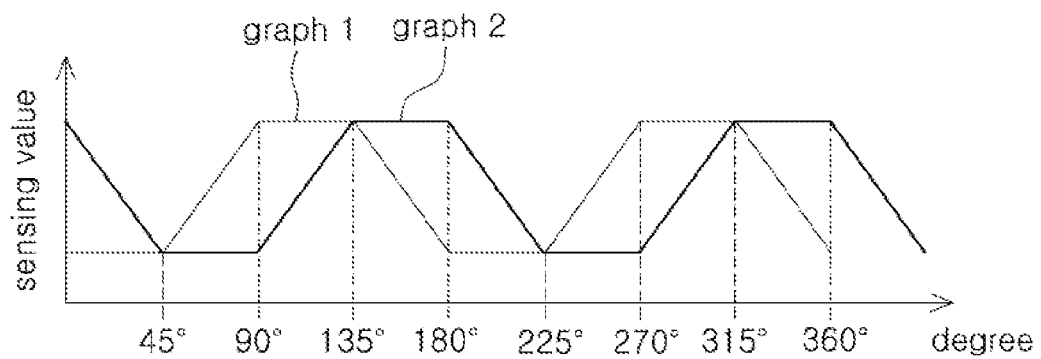
FIG. 4B is a graph illustrating an example of a sensing value measured by a sensor module according to rotation of a unit to be detected.

FIG. 4A is a diagram illustrating a positional relationship of a unit to be detected and a sensor module according to rotation of the unit to be detected according to an embodiment, and FIG. 4B is a graph illustrating an example of a sensing value measured by a sensor module according to rotation of a unit to be detected. In FIG. 4A, a first sensor 31 and a second sensor 32 are illustrated as a sensing coil.

Referring to FIG. 4A, according to rotation of the wheel 10, an overlapping area of the unit to be detected 20 and the sensor module 30 may be changed. In detail, an overlapping area of the first pattern portion 21 and the first sensor 31 and an overlapping area of the second pattern portion 22 and the second sensor 32 may be changed. In FIG. 4A, it is assumed that the first pattern portion 21 and the second pattern portion 22 rotate in a direction from a lower side to an upper side.

In a first state State 1, the first sensor 31 is overlapped with the first pattern portion 21, and the second sensor 32 is not overlapped with the second pattern portion 22. When a pattern formed of a metallic material is adjacent to the first sensor 31 including a sensing coil, a current is applied to a pattern by magnetic flux generated in the sensing coil, and magnetic flux is generated from the pattern by the current applied to the pattern. In this case, the magnetic flux, generated in the pattern, cancels the magnetic flux of the sensing coil of the first sensor 31, thereby reducing inductance of the sensing coil of the first sensor 31. Thus, referring to 0° of FIG. 4B corresponding to the first state State 1, inductance (graph 1) of the first sensor 31 is maintained at a low level, while inductance (graph 2) of the second sensor 32 is maintained at a high level.

After the first state State 1, the first pattern portion 21 and the second pattern portion 21 rotate in a direction from a lower side to an upper side. In the second state State 2, the first sensor 31 is overlapped with the first pattern portion 21, and the second sensor 32 is overlapped with the second pattern portion 22. Thus, referring to 45° of FIG. 4B corresponding to the second state State 2, the inductance (graph 1) of the first sensor 31 is maintained at a low level, and the inductance (graph 2) of the second sensor 32 is changed to a low level.

After the second state State 2, the first pattern portion 21 and the second pattern portion 22 rotate in a direction from a lower side to an upper side. In a third state State 3, the first sensor 31 is not overlapped with the first pattern portion 21, and the second sensor 32 is overlapped with the second pattern portion 22. Thus, referring to 90° of FIG. 4B corresponding to the third state State 3, the inductance (graph 1) of the first sensor 31 is changed to a high level, and the inductance (graph 2) of the second sensor 32 is maintained at a low level.

After the third state State 3, the first pattern portion 21 and the second pattern portion 21 rotate in a direction from a lower side to an upper side. Thus, in a fourth state State 4, the first sensor 31 is not overlapped with the first pattern portion 21, and the second sensor 32 is not overlapped with the second pattern portion 22. Thus, referring to 135° of FIG. 4B corresponding to the fourth state State 4, the inductance (graph 1) of the first sensor 31 is maintained at a high level, and the inductance (graph 2) of the second sensor 32 is changed to a high level.

As set forth above, a thin pattern is manufactured, so it may be advantageous in mass production and cost reduction.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for sensing a rotating body, comprising:
a supporting member having a cylindrical shape, and being connected to a rotating shaft;
a unit to be detected comprising a first pattern portion provided in a first height region of the supporting member, and the first pattern portion comprising first patterns extended in a rotation direction of the rotating shaft and a second pattern portion provided in a second height region of the supporting member, extended in a rotation direction of the rotating shaft, and the second pattern portion comprising second patterns disposed to have an angle difference with the first patterns; and
a sensor module comprising a first sensor disposed opposite to the first pattern portion and a second sensor disposed opposite to the second pattern portion,
wherein the first patterns and the second patterns are formed of a metallic material, and each of the first sensor and the second sensor comprises a sensing coil.

2. The apparatus for sensing a rotating body of claim 1, wherein the supporting member is formed of plastic.

3. The apparatus for sensing a rotating body of claim 1, wherein a groove portion, extended in the rotation direction, is provided on a side surface of the supporting member.

4. The apparatus for sensing a rotating body of claim 3, wherein the first pattern portion and the second pattern portion are provided in the groove portion.

5. The apparatus for sensing a rotating body of claim 4, wherein the first pattern portion and the second pattern portion are exposed externally.

6. The apparatus for sensing a rotating body of claim 1, further comprising:
a rotation information calculator configured to calculate rotation information comprising any one or any combination of a rotation angle and an angular velocity from inductance of the sensing coil of the first sensor, and inductance of the sensing coil of the second sensor.

7. The apparatus for sensing a rotating body of claim 1, wherein the first patterns and the second patterns have a size and a separation distance, corresponding to a reference rotational angle that is determined based on a rotation of the rotating body.

8. The apparatus for sensing a rotating body of claim 7, wherein the first patterns and the second patterns are disposed to have an angle difference corresponding to half of the reference angle.

9. The apparatus for sensing a rotating body of claim 8, wherein the first sensor and the second sensor have a size corresponding to half of the reference angle.

10. The apparatus for sensing a rotating body of claim 1, wherein a shape of the first patterns and the second patterns comprises any one of rectangular, elliptical, parallelogram, rhombic, and trapezoidal shapes.

11. An apparatus for sensing a rotating body, comprising:
a supporting member having a cylindrical shape, and being connected to a rotating shaft;
a unit to be detected comprising a first pattern portion provided in a first height region of the supporting member, and the first pattern portion comprising first patterns extended in a rotation direction of the rotating shaft, and a second pattern portion provided in a second height region of the supporting member, extended in the rotation direction of the rotating shaft, and the second pattern portion comprising second patterns disposed to have an angle difference with the first patterns; and
a sensor module comprising a first sensor disposed opposite to the first pattern portion and a second sensor disposed opposite to the second pattern portion,
wherein the first patterns and the second patterns are formed of a metallic material, and the first patterns and the second patterns have a thickness of 8 μm to 12 μm.

12. The apparatus for sensing a rotating body of claim 11, wherein the supporting member is formed of plastic.

13. The apparatus for sensing a rotating body of claim 11, wherein a groove portion, extended in the rotation direction, is provided on a side surface of the supporting member.

14. The apparatus for sensing a rotating body of claim 13, wherein the first pattern portion and the second pattern portion are provided in the groove portion.

15. The apparatus for sensing a rotating body of claim 14, wherein the first pattern portion and the second pattern portion are exposed externally.

16. The apparatus for sensing a rotating body of claim 11, wherein a shape of the first patterns and the second patterns comprise any one of rectangular, elliptical, parallelogram, rhombic, and trapezoidal shapes.

\* \* \* \* \*